US012811860B2

(12) United States Patent
Gupta et al.

(10) Patent No.: US 12,811,860 B2
(45) Date of Patent: Nov. 24, 2026

(54) RECOMMENDATION AND UPDATE OF NETWORK POLICIES

(71) Applicant: Cisco Technology, Inc., San Jose, CA (US)

(72) Inventors: Sunil Gupta, San Jose, CA (US); Gabriel J. Fontenot, Sunset, LA (US); Naina Kuruballi Mahesh, San Jose, CA (US); Vishnu Chandrashekhar, San Jose, CA (US); Sai Ankith Averineni, Fremont, CA (US); Jana Radhakrishnan, San Jose, CA (US); Furong Ma Gisiger, San Francisco, CA (US); Kaarthik Sivakumar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 22 days.

(21) Appl. No.: 18/731,051

(22) Filed: May 31, 2024

(65) Prior Publication Data

US 2025/0373516 A1 Dec. 4, 2025

(51) Int. Cl.

| | |
|---|---|
| ***G06F 15/173*** | (2006.01) |
| ***H04L 41/0894*** | (2022.01) |
| ***H04L 41/22*** | (2022.01) |
| ***H04L 47/20*** | (2022.01) |

(52) U.S. Cl.

CPC .......... *H04L 41/22* (2013.01); *H04L 41/0894* (2022.05); *H04L 47/20* (2013.01)

(58) Field of Classification Search

CPC ...... H04L 41/22; H04L 41/0894; H04L 47/20

See application file for complete search history.

(56) References Cited

U.S. PATENT DOCUMENTS

| | | | | |
|---|---|---|---|---|
| 10,972,508 | B1 | 4/2021 | Dods | |
| 2012/0278851 | A1 | 11/2012 | Dan | |
| 2016/0359695 | A1 | 12/2016 | Yadav et al. | |
| 2018/0176186 | A1* | 6/2018 | Chao | H04L 63/1425 |
| 2020/0028820 | A1 | 1/2020 | O'Neil | |
| 2020/0106806 | A1* | 4/2020 | Gupta | H04L 61/4511 |
| 2021/0075823 | A1* | 3/2021 | Villeda | H04L 63/0236 |
| 2021/0328884 | A1 | 10/2021 | Veres et al. | |
| 2024/0106866 | A1* | 3/2024 | Shyamala | H04L 63/1425 |

* cited by examiner

*Primary Examiner* — Joseph R Maniwang

(74) *Attorney, Agent, or Firm* — Rutan & Tucker, LLP; Ravi Mohan; Marc A. Mcclain

(57) ABSTRACT

Devices, systems, methods, and processes for recommendation and update of network policies. Existing network policy update solutions rely on human intervention in monitoring and analyzing traffic patterns in a network, checking for policy compliance, detecting any policy violations, and even updating new policies in the network. However, manual processes are prone to human error, introduce significant delays, and lack scalability and objectivity. To address these issues, an automated system is provided that monitors traffic across a network (in real-time or near real-time) and detects violations in a set of network policies associated with the network. The system utilizes one or more recommendation models to process network flow data and network inventory data, and generate one or more policy update recommendations to resolve the detected policy violations. The system further enforces the one or more policy update recommendations on various network devices within the network to resolve the detected policy violations.

14 Claims, 7 Drawing Sheets

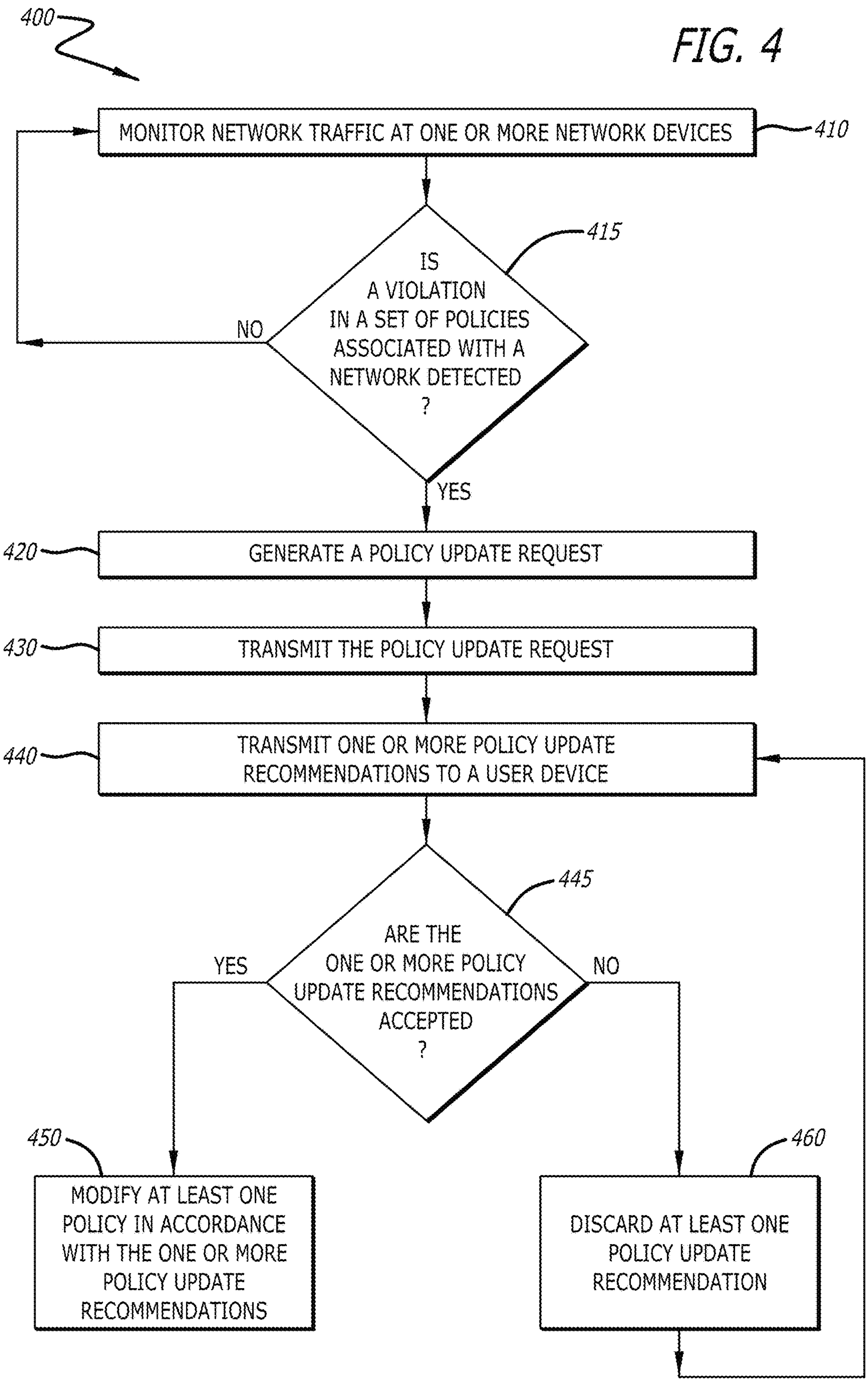
400
FIG. 4
MONITOR NETWORK TRAFFIC AT ONE OR MORE NETWORK DEVICES
410
IS A VIOLATION IN A SET OF POLICIES ASSOCIATED WITH A NETWORK DETECTED ?
415
NO
YES
420
GENERATE A POLICY UPDATE REQUEST
430
TRANSMIT THE POLICY UPDATE REQUEST
440
TRANSMIT ONE OR MORE POLICY UPDATE RECOMMENDATIONS TO A USER DEVICE
ARE THE ONE OR MORE POLICY UPDATE RECOMMENDATIONS ACCEPTED ?
445
YES
NO
450
MODIFY AT LEAST ONE POLICY IN ACCORDANCE WITH THE ONE OR MORE POLICY UPDATE RECOMMENDATIONS
460
DISCARD AT LEAST ONE POLICY UPDATE RECOMMENDATION

RECOMMENDATION AND UPDATE OF NETWORK POLICIES

The present disclosure relates to management of network traffic. More particularly, the present disclosure relates to automatic detection and recommendation of network policies.

BACKGROUND

Network policies provide rules, guidelines, and configurations that define how network resources are accessed, utilized, and secured within a network infrastructure. Such policies may be responsible for establishing a framework for managing and controlling network traffic, security practices, and ensuring compliance with organizational standards as well as regulatory requirements. Network policies may include various aspects of network management such as, but not limited to, access control, traffic prioritization, security protocols, resource allocation, or the like.

To ensure that network policies are appropriately controlled and aligned with organizational goals, these policies demand continuous monitoring and update to adapt to the ever-changing network landscape. Currently, intensive human intervention is needed for network policy maintenance. For example, human operators must monitor network activity to ensure compliance with established policies and detect any deviations or violations. Human operators may use various monitoring tools to analyze traffic patterns, identify anomalies, or investigate potential security incidents.

If policy violations are detected, human operators may take proactive measures to enforce policies and mitigate risks. Human operators must also regularly review and optimize network policies to adapt to evolving threats, changing business requirements, and technological advancements. However, manual maintenance of network policies is a resource-intensive process and is prone to human errors.

SUMMARY OF THE DISCLOSURE

Systems and methods for recommendation and update of network policies in accordance with embodiments of the disclosure are described herein. In some embodiments, a device includes a processor and a network interface controller configured to provide access to a network, wherein the network is associated with a set of policies, and a memory communicatively coupled to the processor. The memory includes a policy adjustment logic configured to monitor network traffic at one or more network devices, detect at least one violation of the set of policies by the monitored network traffic, and transmit one or more policy update recommendations based on the detected at least one violation, wherein a policy update recommendation of the one or more policy update recommendations is configured to delineate a modification in at least one policy of the set of policies.

In some embodiments, the one or more policy update recommendations are transmitted to a user device.

In some embodiments, the one or more policy update recommendations are rendered on a graphical user interface of the user device.

In some embodiments, the policy adjustment logic is further configured to receive, from the user device, an acceptance input for the one or more policy update recommendations.

In some embodiments, the policy adjustment logic is further configured to modify the at least one policy in accordance with the one or more policy update recommendations based on the acceptance input.

In some embodiments, the policy adjustment logic is further configured to receive, from the user device, a rejection input for at least one policy update recommendation of the one or more policy update recommendations.

In some embodiments, the policy adjustment logic is further configured to discard the at least one policy update recommendation based on the rejection input.

In some embodiments, the policy adjustment logic is further configured to transmit a new policy update recommendation based on the rejection input.

In some embodiments, the policy adjustment logic is further configured to identify one or more pattern changes in the network traffic based on the monitoring of the network traffic.

In some embodiments, the policy adjustment logic is further configured to transmit at least one new policy recommendation that corresponds to the one or more pattern changes in the network traffic.

In some embodiments, the policy adjustment logic is further configured to dynamically update at least one network policy of the set of policies based on the one or more pattern changes in the network traffic.

In some embodiments, the network traffic is associated with at least one application running on a network device of the one or more network devices.

In some embodiments, the policy adjustment logic is further configured to transmit the one or more policy update recommendations automatically based on the detection of the at least one violation.

In some embodiments, a policy adjustment logic is configured to receive a policy update request for the set of policies, input at least one of network flow data or network inventory data to at least one recommendation model, obtain an output of the at least one recommendation model based on the inputted at least one of the network flow data or the network inventory data, and generate one or more policy update recommendations based on the output.

In some embodiments, the policy adjustment logic is further configured to pre-process the at least one of the network flow data or the inventory data prior to inputting to the at least one recommendation model.

In some embodiments, the network flow data includes one or more data packets, one or more management packets, or one or more control packets being transmitted via the network.

In some embodiments, the network inventory data includes a Media Access Control (MAC) address of at least one network device connected to the network.

In some embodiments, the at least one recommendation model includes a machine learning model or a heuristic model.

In some embodiments, the policy adjustment logic is further configured to transmit the one or more policy update recommendations to at least one of a traffic monitoring device or a user device.

In some embodiments, a method for policy adjustment includes monitoring network traffic at one or more network devices connected to a network, wherein the network is associated with a set of policies, detecting at least one violation of the set of policies by the monitored network traffic, and transmitting one or more policy update recommendations based on the detected at least one violation, wherein a policy update recommendation of the one or more policy update recommendations is configured to delineate a modification in at least one policy of the set of policies.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 4 is a flowchart showing a process for providing automated network policy update recommendations in accordance with various embodiments of the disclosure;

Figure 1:
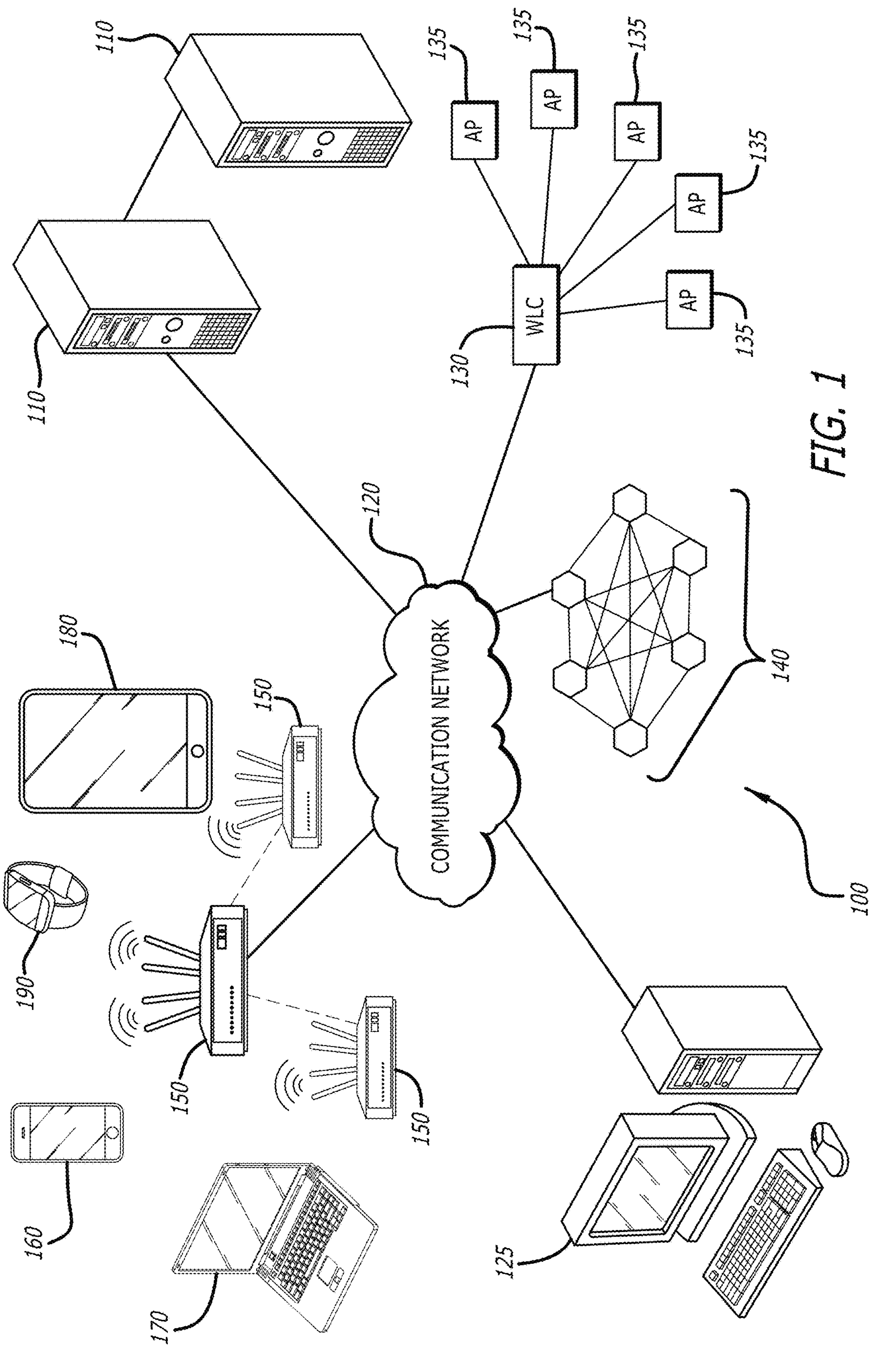
FIG. 1 is a is a conceptual network diagram of various environments that a networking logic may operate on a plurality of network devices in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that provide an automated system for continuous monitoring of network traffic, detecting policy violations in the network, and recommending appropriate policy updates. In many embodiments, the present disclosure provides an automated system for network monitoring and policy recommendations. The system may include a controller that continuously monitors and analyzes network traffic.

In additional embodiments, a controller may be utilized alone or in conjunction with a network management platform that monitors (for example, in real time or near real time) various network devices and services or applications being used by the network devices, analyze traffic pattern, enforce policies, etc. For example, the controller may be a part of an enterprise network and thus, may monitor all the network devices associated with the enterprise, including but not limited to any of various access points (APs), laptops, desktops, smartphones, portable digital assistants (PDA), mobile devices, Internet of Thing (IoT) devices, routers, switches, servers, hubs, projectors, or the like. In many embodiments, such network devices may adhere to a set of network policies as set by an enterprise.

In a variety of embodiments, the controller while monitoring the traffic from the network devices may detect violations in one or more network policies. For example, the controller may detect an unusual amount of video streaming traffic (such as over-the-top platforms) from a laptop during official working hours. In another example, the controller may detect a network device accessing a blocked website, such as social media (Facebook, Twitter, or the like). As another example, the controller may detect that multiple devices of the enterprise have received malicious traffic. Malicious traffic can include malware such as viruses, worms, Trojans, ransomware, spyware, or the like that can propagate through the network via email attachments, file downloads, removable storage devices, or compromised websites. Other examples of malicious traffic can include bots that are controlled remotely by attackers, phishing attacks that involve fraudulent emails, messages, etc. that are designed to trick users into divulging sensitive information, such as login credentials, financial data, or personal information. Likewise, the controller can detect any violation in the one or more network policies.

In many embodiments, the controller may request a policy server for policy update recommendations. The policy server may be used in enterprise networks to control user authorization, authentication, and ensure compliance with security requirements. The controller may provide the policy server with specific inputs regarding the type of violation in the existing policies. For example, the controller may inform the policy server whether there was a botnet activity in the enterprise network, a phishing attack, or if it was just a group of devices accessing a website that is blocked for the enterprise by bypassing the security policy.

In additional embodiments, the policy server may perform policy processing that includes gathering information regarding the network for which policy update recommendation is needed or otherwise requested. The policy server may collect network information as network flow data and network inventory data. The network flow data may refer to actual flow of data within the network. For example, the network flow data can include all data packets that carry traffic from the network devices, control packets, or management packets. The network inventory data may include information regarding various devices in the network that have generated the network flow data, for example, Media Access Control (MAC) or Internet Protocol (IP) addresses of all the devices, edge devices, virtual machines (VMs), or the like. In additional embodiments, the network flow data and the network inventory data may be stored in a distributed file system (DFS). DFS may refer to a file system that allows files to be stored across multiple storage devices and servers in a distributed fashion, while providing access to the stored files in a manner as if the files were stored on a single logical file system.

In further embodiments, the network flow data and the network inventory data may be pre-processed using various data processing algorithms. For example, the network flow data and the network inventory data may be processed using big data algorithms such as Exploratory Data Analysis (EDA) algorithms, clustering algorithms, classification algorithms, dimensionality reduction algorithms, or the like. Big data algorithms can be used for the extraction and analysis of information from huge volumes of data. In still additional embodiments, the network may include multiple devices belonging to different categories (for example, edge devices, access points, servers, virtual machines (VMs), smartphones, laptops, desktop computers, wearable devices, etc.) that can generate different types of unstructured traffic in the network depending upon the type of protocol used, type of packet size, header information, or the like. Therefore, in many embodiments, the policy server may pre-process the network flow data and the network inventory data to obtain processed data structure.

In still additional embodiments, the policy server may use the EDA algorithm to explore and visualize raw data to understand data behavior and characteristics. Similarly, clustering algorithms (for example, k-means clustering, hierarchical clustering, etc.) may be used to group similar data points into clusters or groups. Classification algorithms such as Decision Trees, Naive Bayes, Logistic Regression, Support Vector Machines, or the like may be used to categorize data into predefined classes or labels. In a similar manner, dimensionality reduction algorithm (for example, Principal Component Analysis (PCA), Singular Value Decomposition (SVD), or the like) can be used to reduce the number of input variables (features) in a dataset while preserving important information. The pre-processing operation may also include network topology analysis using graph-based algorithms to analyze the structure and connectivity of network nodes and edges to identify critical network components, bottlenecks, or potential points of failure. Similarly, the pre-processing operation may also include social network analysis that employs graph analytics to analyze the relationships and interactions between network entities (e.g., users, devices, or applications) to detect patterns of collaboration or information flow, thus, aiding in network security.

In still further embodiments, the policy server may feed the pre-processed structured data as input to a recommendation model. In some additional embodiments, the recommendation model may receive the structured data corresponding to one or more violations of the network policy by various network devices. The recommendation model may include heuristic models and machine learning models to further process the input data. Heuristic models may use rule-based approach and rely on predefined rules, guidelines, or strategies based on domain knowledge, intuition, or past experience to guide decision-making and problem-solving, without learning from data. Heuristic models can be used to provide an approximate solution in decision-making and prioritizes speed and efficiency over optimality. Machine Learning (ML) models may learn patterns and relationships from data through automated learning algorithms, without relying on predefined rules or explicit programming. ML models may analyze input data, identify patterns, and make predictions or decisions based on the learned patterns. The policy server can use heuristic models with the ML models to accelerate decision making and finding an optimal solution.

In still additional embodiments, the recommendation model may generate an output based on the processing of the input data, for example, by the ML model and the heuristic models. The output may be post-processed for fine-graining and quality to generate a final output of the recommendation model. For example, the post-processing of the output may involve refining, interpreting, and improving the predictions or results generated by the model to better meet the requirements of the specific application or task. The post-processing operation may include knowledge filtering to simplify the extracted knowledge and improve interpretability, techniques to interpret and explain the output of ML models, evaluating the quality and accuracy of the rules/patterns extracted by the ML model, combining the outputs from multiple ML models, or the like.

In many embodiments, the final output may include one or more policy recommendations that can be used to overcome (or adjust) the detected violations in the network policies. In yet additional embodiments, the recommendation model may forward the final output to the policy server. The policy server, in still yet additional embodiments, may forward the policy recommendations to the controller. In many further embodiments, the recommendation model may be a part of the policy server. In many additional embodiments, the controller may ensure that the one or more policy recommendations are as expected. For example, the controller may check for correct labels and information associated with the policy recommendations for easy auditing. In still yet further embodiments, the controller may present the one or more policy recommendations on a graphical user interface (GUI).

In still yet additional embodiments, a user or an administrator may audit the suggested one or more policy recommendations and may provide his or her preference for the suggested one or more policy recommendations using the GUI. For example, the controller may present the user with an option to either accept or reject a policy recommendation. If the user accepts the policy recommendation, the controller may enforce the suggested policy in the network to make the necessary policy update. In several embodiments, the controller may store the user preference for future processing. The present disclosure, therefore, discloses a system or a method for continuous monitoring of a network to detect any violation of network policies and to recommend one or more policies based on the detected violation. In many embodiments, a user or administrator may audit the recommended one or more policies for the detected violation. Since the system continuously monitors the network traffic, network policy violations can be detected immediately as they happen. Thus, ensuring a reduced response time in policy adjustment as compared to human analysis.

It should be appreciated that generally, human operators that monitor and analyze traffic patterns in a network, verify policy compliance, detect policy violations, and/or update new policies in the network based on the detected violations may be prone to error. Additionally, human judgment can be subjective, varying from one individual to another. Subjectivity can lead to inconsistent decision-making and interpretations of network data, making it difficult to establish standardized policies. Further, in today's digital landscape, where threats and policy violations can propagate rapidly through a network, anything less than real-time monitoring capability might not be enough. To that end, human review process can be time-consuming, considering the volume of ever-increasing network traffic, and delays can be introduced in identifying and addressing network policy violations. Furthermore, modern network infrastructures are highly complex and dynamic, with diverse traffic patterns, protocols, and endpoints. Thus, manual review of network policy violations and solution recommendations are ill-suited to handle such complexity and variability effectively.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual network diagram 100 of various environments that a networking logic may operate on a plurality of network devices in accordance with various embodiments of the disclosure is shown. Those skilled in the art will recognize that the networking logic can include various hardware and/or software deployments and can be configured in a variety of ways. In many embodiments, the networking logic can be configured as a standalone device, exist as a logic in another network device, be distributed among various network devices operating in tandem, or remotely operated as part of a cloud-based network management tool. In further embodiments, one or more servers 110 can be configured with the networking logic or can otherwise operate as the networking logic. In many embodiments, the networking logic may operate on one or more servers 110 connected to a communication network 120 (shown as the "Internet"). The communication network 120 can include wired networks or wireless networks. The networking logic can be provided as a cloud-based service that can service remote networks, such as, but not limited to a deployed network 140.

However, in additional embodiments, the networking logic may be operated as a distributed logic across multiple network devices. In the embodiment depicted in FIG. 1, a plurality of network APs 150 can operate as the networking logic in a distributed manner or may have one specific device operate as the networking logic for all of the neighboring or sibling APs 150. The APs 150 may facilitate Wi-Fi connections for various electronic devices, such as but not limited to, mobile computing devices including laptop computers 170, cellular phones 160, portable tablet computers 180 and wearable computing devices 190.

In further embodiments, the networking logic may be integrated within another network device. In the embodiment depicted in FIG. 1, a wireless LAN controller (WLC) 130 may have an integrated networking logic that the WLC 130 can use to monitor or control power consumption of the APs 135 that the WLC 130 is connected to, either wired or wirelessly. In still additional embodiments, a personal computer 125 may be utilized to access and/or manage various aspects of the networking logic, either remotely or within the network itself. In the embodiment depicted in FIG. 1, the personal computer 125 communicates over the communication network 120 and can access the networking logic of the servers 110, or the network APs 150, or the WLC 130. In still additional embodiments, the WLC 130 may be capable of monitoring network traffic flowing across the network.

Although a specific embodiment for various environments that the networking logic may operate on a plurality of network devices suitable for carrying out the various steps, processes, methods, and operations described herein is discussed with respect to FIG. 1, any of a variety of systems and/or processes may be utilized in accordance with embodiments of the disclosure. In many non-limiting examples, the networking logic may be provided as a device or software separate from the WLC 130 or the networking logic may be integrated into the WLC 130. The elements depicted in FIG. 1 may also be interchangeable with other elements of FIGS. 2-10 and as required to realize a particularly desired embodiment.

Figure 2:
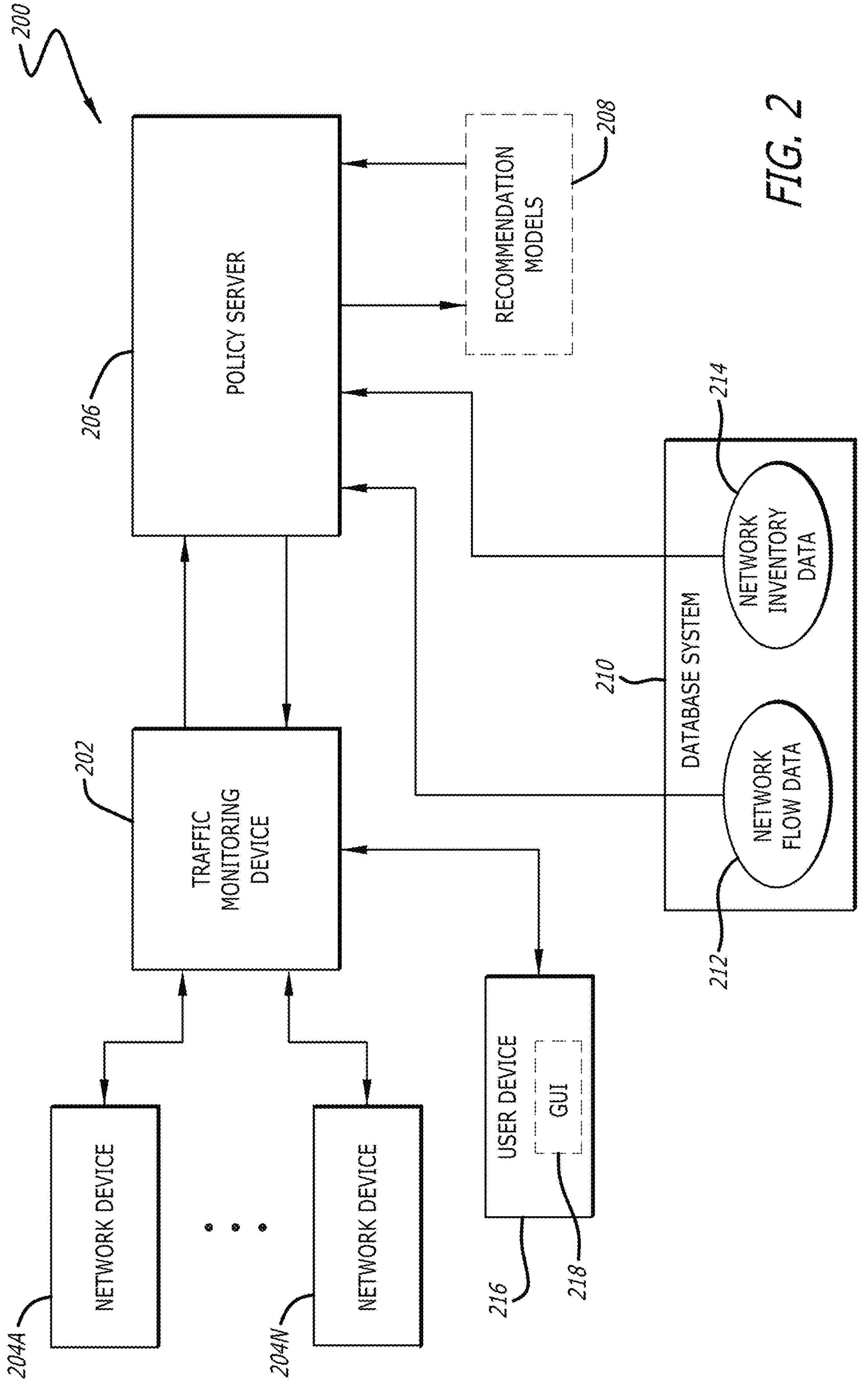
FIG. 2 is a conceptual illustration of an example computing system utilized for recommendation and update of network policies in accordance with various embodiments of the disclosure.

Referring to FIG. 2, a conceptual illustration of an example computing system 200 utilized for recommendation and update of network policies in accordance with various embodiments of the disclosure is shown. The embodiment shown in FIG. 2 may depict a scenario where a traffic monitoring device 202 may be coupled to one or more network devices 204A-204N for monitoring traffic. Further, the traffic monitoring device 202 may be communicatively coupled to a policy server 206. The policy server 206 can be connected to various recommendation models 208 and a database system 210.

In many embodiments, the traffic monitoring device 202 may be configured to monitor network traffic at the network devices 204A-204N. For example, the traffic monitoring device 202 may monitor various applications running on the network devices 204A-204N to monitor the network traffic. Network traffic may refer to data (e.g., packets or frames)

being transmitted and received by the network devices 204A-204N. The traffic monitoring device 202 may be configured to extract information from the packets flowing across the network as the network traffic. For example, the traffic monitoring device 202 may perform packet parsing to extract relevant information from the packets. The traffic monitoring device 202 may decompose the packets into individual components, such as header, payload, trailer, or the like, and extract specific fields or attributes from these individual components. For example, the traffic monitoring device 202 may extract source and destination Internet Protocol (IP) addresses, port numbers, protocol information, packet payload, packet headers, application layer data, session information, or the like. The traffic monitoring device 202 may further perform data interpretation for the extracted fields, for example, extracting uniform resource locator (URL) from a Hypertext Transfer Protocol (HTTP) packet. Further, the traffic monitoring device 202 may perform validation checks to ensure that the extracted data is valid and conforms to the expected format, protocol violations, or any other violations. In still additional embodiments, the traffic monitoring device 202 may provide the parsed packet data in a structured format suitable for further analysis, processing, or visualization. In an example scenario, the traffic monitoring device 202 may be a network logging and monitoring tool that captures traffic from the network devices 204A-204N (such as routers, switches, firewalls, access points, hubs, switches, intrusion detection/prevention systems, or the like) to provide insights into traffic patterns, bandwidth utilization, and security events.

In additional embodiments, the traffic monitoring device 202 may utilize a Packet Capture (PCAP) Tool or may employ Security Information and Event Management (SIEM) Systems. The PCAP tool can be used to capture and store packet-level data traversing the network interfaces of the network devices 204A-204N. The PCAP tools may allow the traffic monitoring device 202 to inspect individual packets, diagnose network issues, analyze protocols, and investigate security incidents. Similarly, SIEM systems may aggregate and correlate log and event data from various sources across the network and provide centralized monitoring, analysis, and reporting of security events.

In further embodiments, the traffic monitoring device 202 may utilize flow monitoring techniques such as NetFlow, sFlow, or the like for collecting aggregated traffic data at flow level, including source and destination Internet Protocol (IP) addresses, ports, protocol types, and byte counts. The data can be exported from the network devices 204A-204N to the traffic monitoring device 202 for monitoring network performance, detecting anomalies, and optimizing network performance. NetFlow is a protocol developed by Cisco that collects and analyzes network traffic data. sFlow is a vendor-neutral protocol for monitoring network traffic. In still additional embodiments, the traffic monitoring device 202 may utilize Deep Packet Inspection (DPI) to inspect the contents of network packets at the application layer to classify traffic based on application protocols, user activities, and content attributes. DPI can be used to enforce network policies, control access to network resources, and manage network traffic more effectively.

In an example scenario, the traffic monitoring device 202 may operate within an enterprise network to monitor the network devices 204A-204N. The network devices 204A-204N may refer to devices, such as desktops, laptops, mobile devices, servers, smartphones, routers, hubs, switches, Internet of Thing (IoT) devices, printers, projectors, or the like, that are configured to carry out the business operations for the enterprise. These network devices 204A-204N may be configured to operate in accordance with a set of network policies associated with the network. For example, one of the network policies may restrict users of certain designation or group to upload data from their devices on Internet or restrict their outgoing emails.

Similarly, in additional embodiments, a network policy may prevent users of a certain designation or group from accessing one or more websites such as YouTube, over-the-top (OTT) platforms, or the like on the network devices 204A-204N configured or associated with the enterprise network. The traffic monitoring device 202, in many embodiments, may monitor these network devices 204A-204N and detect any changes in the network behavior, violation of any of the set of network policies, changes in the monitored traffic pattern, or update to an application request. For example, the traffic monitoring device 202 may detect that one of the network devices 204A is consuming a lot of bandwidth and monitored traffic pattern shows traffic consumed from an OTT platform. The network device 204A ideally should not have the access to the OTT platform; however, the network policy may have reset during an update for this network device 204A. In another example, the traffic monitoring device 202 may detect that many network devices 204A-204N have received phishing emails or have been attacked by bot activity. In such scenarios, the traffic monitoring device 202 may detect violation of one or more network policies.

In a variety of embodiments, the traffic monitoring device 202 may request the policy server 206 for processing and recommending one or more updated policies for the network. The policy server 206 may be responsible for determining network policies for specific organizational requirements, control user authentication, authorization, access control, and ensuring compliance with set policies of an enterprise or organization. In additional embodiments, the traffic monitoring device 202 may forward specific inputs along with the request for policy processing. The specific inputs can include the type of violation or changes in the traffic pattern detected by the traffic monitoring device 202.

In additional embodiments, the policy server 206 may perform policy processing and set up a policy processing pipeline. In additional embodiments, the policy server 206 may access the database system 210 to retrieve network flow data 212 and network inventory data 214. The network flow data 212 may refer to the actual flow of packets within the network. For example, the network flow data 212 can include all packets that carry traffic from the network devices 204A-204N, control packets, or management packets. Similarly, the network inventory data 214 may include information regarding all the devices in the network that have generated the network data. For example, the network inventory data 214 may include Media Access Control (MAC) or IP addresses of the network devices 204A-204N, edge devices, virtual machines (VMs), device identifiers, or the like. The database system 210 may be a distributed file system (DFS) having files stored across multiple storage devices and servers in a distributed fashion.

In still further embodiments, the policy server 206 may pre-process the network flow data 212 and the network inventory data 214 using various big data algorithms. The policy server may use the EDA algorithm to explore and visualize raw data to understand data behavior and characteristics. Similarly, clustering algorithms (for example, k-means clustering, hierarchical clustering, etc.) may be used to group similar data points into clusters or groups. Classification algorithms such as Decision Trees, Naive Bayes, Logistic Regression, Support Vector Machines, or the like may be used to categorize data into predefined classes or labels. In a similar manner, dimensionality reduction algorithm (for example, Principal Component Analysis, Singular Value Decomposition, or the like) can be used to reduce the number of input variables (features) in a dataset while preserving important information. The pre-processing operation may also include network topology analysis using graph-based algorithms to analyze the structure and connectivity of network nodes and edges to identify critical network components, bottlenecks, or potential points of failure. Similarly, the pre-processing operation may also include social network analysis that employs graph analytics to analyze the relationships and interactions between network entities (e.g., users, devices, or applications) to detect patterns of collaboration or information flow, thus, aiding in network security.

For example, the network may include multiple devices belonging to different categories (for example, edge devices, servers, VMs, smartphones, laptops, desktop computers, CCTVs, wearable devices, etc.) that generate different types of unstructured traffic in the network depending upon the type of protocol used, type of packet size, header information, type of communication taking place, or the like. Therefore, in many embodiments, the policy server 206 may pre-process the network flow data 212 and the network inventory data 214 to obtain processed data structure. The processed data structure in this case may refer to a data structure that has been manipulated, analyzed, or transformed in some way to extract useful information or perform specific operations related to network management, monitoring, analysis, or optimization.

In still additional embodiments, the policy server 206 may input the pre-processed structured data to the recommendation model 208. The recommendation model 208 may include heuristic models and machine learning (ML) models to process the structured input data. Here, the structured data may be associated with the one or more violations detected in the network policy by the traffic monitoring device 202, or structured data regarding a security incident detected by the traffic monitoring device 202.

In many embodiments, the recommendation model 208 may generate an output based on the processing of the inputted data by the ML models and the heuristic models. The recommendation model 208 may further post-process the output to generate a final output. The post-processing steps may include refining, interpreting, and improving the predictions or results generated by the ML models and the heuristic models to better meet the requirements of the specific application or task. In another example scenario, the post-processing may include statistical post-processing in which calibration or smoothing may be applied to refine the output of the ML models and the heuristic models. In yet additional embodiments, the final output may include one or more policy update recommendations or suggestions to overcome or adjust the detected violations in the network policy. For example, if the detected violation of the policy was a security incident involving spam emails to all the employees of an organization, the recommendation model 208 may recommend updating anti-spam policies, enhancing email filtering, enforcing sender verification mechanisms such as (Sender Policy Framework), DKIM (DomainKeys Identified Mail), etc., to verify the authenticity of email senders, or the like to prevent such incidents. In other words, a policy update recommendation may be configured to delineate a modification in at least one policy of the set of policies to overcome the detected violation.

In still yet additional embodiments, the recommendation model 208 may forward the final output of the one or more policy update recommendations to the policy server 206. In many further embodiments, the policy server 206 may forward the one or more policy update recommendations to the traffic monitoring device 202. The traffic monitoring device 202 may check if the one or more policy update recommendations can be used to make adjustments for the detected violations or security incident. The traffic monitoring device 202 may also check for correct labels and information associated with the one or more policy update recommendations for easy auditing. In still yet further embodiments, the traffic monitoring device 202 may present the one or more policy update recommendations on a graphical user interface (GUI) 218 of a user device 216.

In many additional embodiments, a user or an administrator of the user device 216 may audit the suggested one or more policy update recommendations and may provide an acceptance input or a rejection input for the suggested one or more policy update recommendations. For example, the traffic monitoring device 202 may present the user with options to either accept or reject the suggested one or more policy update recommendations. In several embodiments, if the suggested one or more policy update recommendations are accepted by the user and the traffic monitoring device 202 receives an acceptance input from the user device 216, the traffic monitoring device 202 may enforce the suggested one or more policies for the network to make the necessary policy adjustments. For example, the traffic monitoring device 202 may enforce the suggested one or more policy recommendations for the network devices 204A-204N. In several embodiments, the traffic monitoring device 202 may store the user preferences for future processing.

It should be understood that the traffic monitoring device 202 may provide feedback regarding the user input for the suggested one or more policy update recommendations to the recommendation model 208 for future processing. For example, if the user rejects the suggested one or more policy update recommendations, the recommendation model 208 may not suggest such policy update recommendations for future policy violations of a similar manner. In further additional embodiments, the traffic monitoring device 202 may continuously monitor the network traffic and automatically transmit the one or more policy update recommendations to the user device 216 based on the detected violations of the one or more network policies.

Although a specific embodiment for an example computing system utilized for recommendation and update of network policies suitable for carrying out the various steps, processes, methods, and operations described herein is discussed with respect to FIG. 2, any of a variety of systems and/or processes may be utilized in accordance with embodiments of the disclosure. For example, the recommendation model 208 may forward the output of the ML models to a policy suggestions module that performs the post-processing operations. The policy suggestions module may filter out certain predictions, aggregate results, or any other processing necessary to prepare the final output for the intended policy violation adjustment. The policy suggestion module may then forward the processed final output to the policy server 206 or the traffic monitoring device 202. The elements depicted in FIG. 2 may also be interchangeable with other elements of FIGS. 1 and 3-7 as required to realize a particularly desired embodiment.

Figure 3:
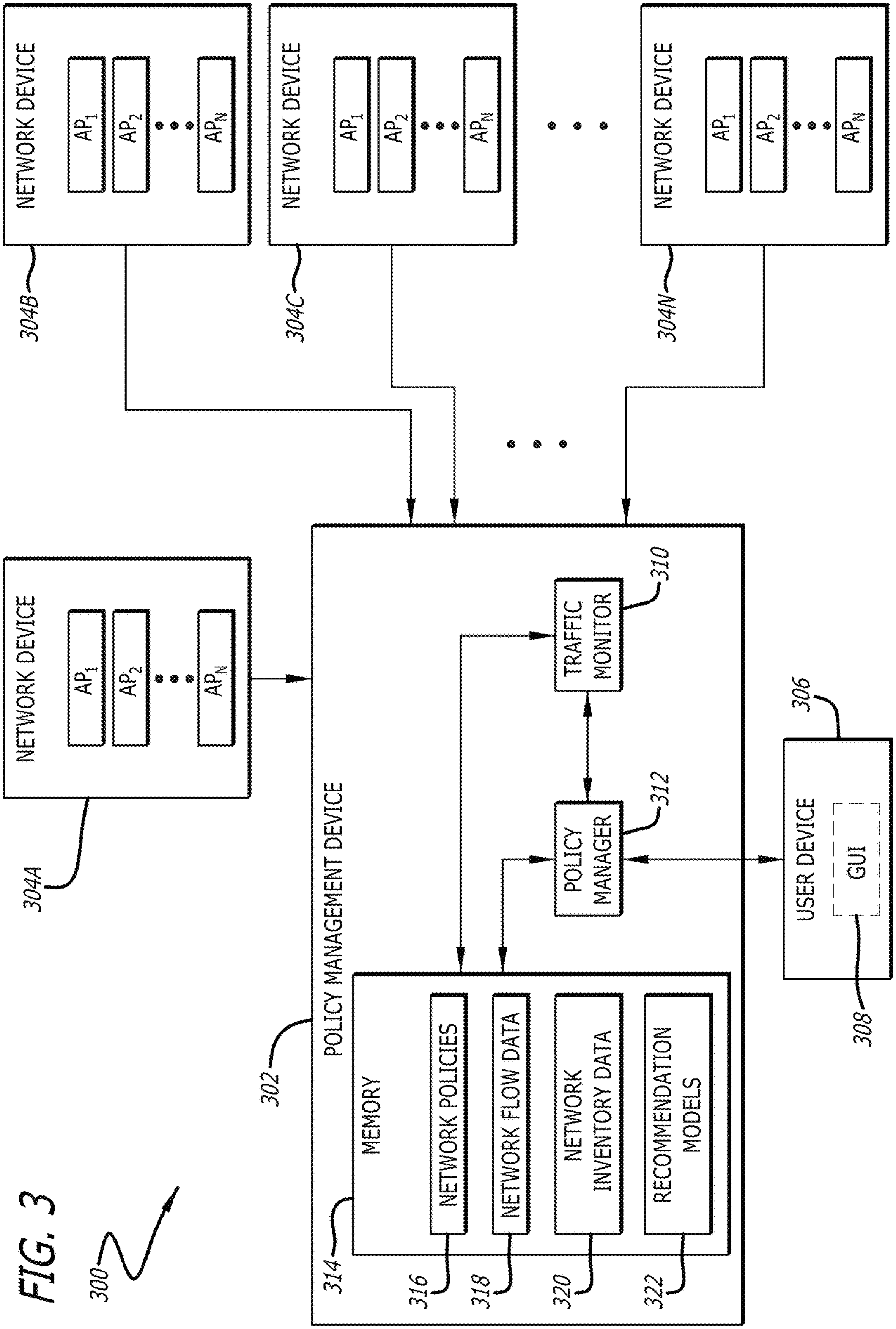
FIG. 3 is a conceptual illustration of an example policy management device for recommending and updating network policies in accordance with various embodiments of the disclosure.

Referring to FIG. 3, a conceptual illustration 300 of an example policy management device 302 for recommending and updating network policies in accordance with various embodiments of the disclosure is shown. The embodiments shown in FIG. 3 may depict a scenario where the policy management device 302 may be responsible for monitoring the traffic of a network, determining network policies for specific organizational requirements, ensuring compliance with set policies of an enterprise or organization, and enforcing network policies. In many embodiments, the policy management device 302 may be coupled to one or more network devices 304A-304N for monitoring. The policy management device 302 may be communicatively coupled to a user device 306 and may render a GUI 308 on the user device 306 for providing policy recommendations.

In a number of embodiments, the policy management device 302 may include a traffic monitor 310 that may monitor the traffic generated by one or more applications $AP_1, \ldots, AP_N$ running on the network devices 304A-304N. The traffic monitor 310 can be a network logging and monitoring tool, a PCAP Tool, or may utilize a SIEM system. The traffic monitor 310 can also use DPI to inspect the contents of network packets. For example, the network device 304A may be using a video conferencing service on the application $AP_1$ and generating traffic related to the video conferencing service. Similarly, the network device 304B may be using an email application $AP_2$ for sending and receiving emails, and also using a web browser application $AP_3$ to search information on the Internet. In another example, the network device 304C may be a smartphone of a user having a work-related profile configured for the user as Bring Your Own Device (BYOD) configuration. In the BYOD environment, employees of an organization can use their personal devices, such as smartphones, tablets, laptops, or wearables, for work-related activities. Such employees are permitted to connect their personal devices to the organization's network, access company resources, and perform work tasks using their own devices. Therefore, in such scenarios, the policy management device 302 may need to configure the work profile on the personal device (such as the network device 304C) of the user. The work profile ensures that the network device 304C of the user adheres to the network policies of the organization.

In a variety of embodiments, the policy management device 302 may include a policy manager 312 that may determine one or more new network policies for specific organizational requirements, control user authentication, authorization, and ensuring compliance with a set of network policies of an enterprise. The policy manager 312 may manage or administer which network policies to be enforced on different type of devices present within the organizational network or enterprise. For example, the organization may have multiple type of devices to serve specific functions. These devices may be desktops, smartphones, laptops, servers, projectors, CCTV cameras, switches, routers, hubs, IoT devices, printers, etc. Each of these devices may be generating their own traffic following various protocols, data types, etc. Thus, each type of device needs to be configured with specific network policies based on its functionality. Further, the specific network policies for a particular device may also depend upon the designation or authorization level of a user of the particular device. For example, the policy manager 312 may set up network policies on a desktop of the organization configured for an entry-level associate for sending and receiving only the internal communication emails. Whereas the policy manager 312 may set up the network policies for a desktop of the organization configured for a manager level as having access to external email communications as well.

In additional embodiments, the policy manager 312 may be in communication with the traffic monitor 310. The traffic monitor 310 may analyze the network behavior, identify the traffic patterns, and may detect one or more violations of the set of network policies. For example, the user of the smartphone 304C may be viewing video content on an OTT platform while being in the work premises. Another example could be that the user of the smartphone 304C may have uploaded certain unauthorized work-related content from his work profile to a website. The traffic monitor 310 may also detect security incidents such as phishing emails received by the network devices 304A-304N. In additional embodiments, the traffic monitor 310 may detect such anomalies in the network traffic and may request the policy manager 312 for policy adjustment.

In additional embodiments, the policy manager 312 may access the memory 314 of the policy management device 302 to access the set of network policies 316. The set of network policies 316 may refer to different type of network policies being used for different applications, different network devices, and specific use cases. The memory 314 may also include network flow data 318 and network inventory data 320. The network flow data 318 may refer to the actual flow of packets within the network. For example, the network flow data 318 can include all packets that carry traffic from the network devices 304A-304N, control packets, or management packets. Similarly, the network inventory data 320 may include information regarding all the devices 304A-304N in the network that have generated the network data 318. For example, the network inventory data 320 may include MAC addresses of all the devices, edge devices, VMs, or the like. In further embodiments, the policy manager 312 may retrieve and pre-processes the network flow data 318 and the network inventory data 320 using various big data algorithms. The policy manager 312 pre-processes the network flow data 318 and the network inventory data 320 to obtain a processed data structure. The network flow data 318 and the network inventory data 320 may be processed using big data algorithms such as EDA Algorithms, clustering Algorithms, classification algorithms, dimensionality reduction algorithms, or the like.

In further embodiments, the memory 314 may also include one or more recommendation models 322. The recommendation model 322 may include heuristic models and ML models that are used to process structured input data and provide one or more recommendations for policy adjustments. In still additional embodiments, the policy manager 312 may input the processed data structure and the detected anomalies in the network traffic to the recommendation model 322. The recommendation model 322 may use the ML model and the heuristic model to process the input data. The recommendation model 322 may perform the post-processing steps (such as refining, interpreting, or the like) and provide the final output as one or more policy recommendations or suggestions to overcome the detected policy violations in the network.

In still further embodiments, the recommendation model 322 may provide the one or more policy update recommendations to the policy manager 312. The policy manager 312 may refer the set of network policies 316 to check if the one or more policy update recommendations can be utilized to rectify the detected violations or security incident. The policy manager 312 may check for correct labels and information associated with the one or more policy update recommendations for easy auditing. In still additional embodiments, the policy manager 312 may present the one or more policy update recommendations on the GUI 308 of the user device 306. In some additional embodiments, a user or an administrator of the user device 306 may audit the suggested one or more policy recommendations and may provide an acceptance input or a rejection input for the suggested one or more policy recommendations. In several embodiments, if the one or more policy update recommendations are accepted and an acceptance input is received by the policy manager 312, the policy manager 312 may update at least one policy in the set of policies 316 and enforce the updated set of policies 316 on the network devices 304A-304N. In several embodiments, the policy manager 312 may store the user preferences for future processing.

Although a specific embodiment of an example policy management device for recommending and updating network policies suitable for carrying out the various steps, processes, methods, and operations described herein is discussed with respect to FIG. 3, any of a variety of systems and/or processes may be utilized in accordance with embodiments of the disclosure. For example, in numerous embodiments, the recommendation model 322 may only include ML models to provide recommendations for one or more policy updates based on the detected policy violation, the network flow data 318, and the network inventory data 320. The elements depicted in FIG. 3 may also be interchangeable with other elements of FIGS. 1-2 and 4-7 as required to realize a particularly desired embodiment.

Referring to FIG. 4, a flowchart showing a process 400 for providing automated network policy update recommendations in accordance with various embodiments of the disclosure is shown. In many embodiments, the process 400 may monitor network traffic at one or more network devices (block 410). The one or more network devices may include devices such as desktops, laptops, servers, smartphones, routers, hubs, switches, IoT devices, projectors, or the like that generate traffic in a network. The one or more network devices may be a part of an enterprise network. In a number of embodiments, the one or more network devices of the network may be configured to comply with a set of network policies associated with the network.

In a variety of embodiments, the process 400 may detect if there is a violation in the set of network policies associated with the network (block 415). The process 400 may monitor the one or more network devices to check if the one or more network devices are compliant with the set of network policies. The process 400 may check the packets flowing across the network to detect any deviation from the set of network policies. In many embodiments, the process 400 may extract information from the packets to check whether the set of network policies are being met. In several embodiments, the process 400 may perform packet parsing to extract the relevant information and may perform validation checks to ensure that the extracted data is valid and conforms to the expected format. For example, the process 400 may check the source and destination IP addresses of each packet to determine if the received packets are from a legitimate source or some spoof website.

In additional embodiments, when a violation of one or more network policies or a security incident is detected, the process 400 may generate a policy update request (block 420). The policy update request may include specific inputs regarding the detected violation of the one or more network policies. The policy update request may also include the number and the type of devices involved in the violation of the one or more network policies. In additional embodiments, the specific inputs may also include detection of security incidents. For example, the process 400 may generate the policy update request regarding phishing attacks on the one or more network devices of the enterprise network.

In additional embodiments, the process 400 may transmit the policy update request (block 430). The process 400 may transmit the policy update request to a policy server along with the specific inputs. In additional embodiments, the policy server may access a distributed file system to gather information regarding network flow data and network inventory data. The network flow data may refer to the actual flow of packets within the network, whereas the network inventory data may include information regarding all the devices in the network that generated the network data. The policy server may pre-process the network flow data and the network inventory data to provide processed data structure. In further embodiments, the policy server may input the processed data structure and the specific inputs regarding the policy violation to a recommendation model. In still additional embodiments, the recommendation model processes the input data to provide one or more policy update recommendations. In still further embodiments, the process 400 may receive the one or more policy update recommendations from the policy server.

In still additional embodiments, the process 400 may transmit the one or more policy update recommendations to a user device (block 440). The user device may be accessed by a network administrator responsible for maintaining and managing the network policies for specific organizational requirements. The one or more policy update recommendations may be rendered on a GUI of the user device. The GUI may be hosted and controlled by the process 400. The process 400 may provide an option to accept or reject each of the one or more policy update recommendations. For example, an interactive action item may be presented against each policy update recommendation on the GUI for accepting or rejecting each of the corresponding policy update recommendations.

In some additional embodiments, the process 400 may determine if the one or more policy update recommendations are accepted (block 445). For example, an acceptance input may be provided by the user for the one or more policy update recommendations. When the process 400 receives the acceptance input, the process 400 may determine that the one or more policy update recommendations are accepted. However, when the process 400 receives a rejection input for any of the one or more policy update recommendations, the process 400 may determine that the corresponding policy update recommendations are rejected.

In many embodiments, if the one or more policy update recommendations are accepted, the process 400 may modify at least one policy in accordance with the one or more policy update recommendations (block 450). For example, an older network policy may have allowed an access to WEBSITE A on the network devices. However, data pertaining to the network flow data associated with the WEBSITE A may have violated bandwidth allocation policy for each network device. Thus, one of the policy update recommendations may delineate a change in the older network policy, for example, block access to the WEBSITE A. Thus, the process 400 may update the older policy that allowed access to WEBSITE A to now block access to WEBSITE A on the network devices. Further, the process 400 may be configured to enforce the updated set of policies on the network devices. For example, to enforce an updated network policy regarding the access to the WEBSITE A, the process 400 may cause an access point to redirect any HTTP or HTTPS traffic from the network devices destined for the blocked WEBSITE A to a proxy server. The proxy server can then display a block page on the network device. In other words, once a policy update recommendation is accepted by the network administrator, the process 400 automatically enforces the policy update recommendation across all network devices by making one or more modifications to the existing set of policies.

In yet additional embodiments, if at least one policy update recommendation is not accepted, the process 400 may discard the at least one policy update recommendation (block 460). The process 400 may discard the at least one policy update recommendation for which a rejection input is received. The process 400 may store a selection preference of the network administrator for future policy processing. For example, if a policy update recommendation is rejected by the network administrator, the process 400 may avoid providing similar policy update recommendations in future. In still yet additional embodiments, the process 400 may transmit one or more new policy update recommendations to the user device based on the received rejection input (block 440).

Although a specific embodiment for providing automated network policy update recommendations suitable for carrying out the various steps, processes, methods, and operations described herein is discussed with respect to FIG. 4, any of a variety of systems and/or processes may be utilized in accordance with embodiments of the disclosure. For example, in still yet additional embodiments, along with a future policy update request, the process 400 may provide information regarding the rejected policy update recommendations for model learning and training. The elements depicted in FIG. 4 may also be interchangeable with other elements of FIGS. 1-3 and 5-7 as required to realize a particularly desired embodiment.

Figure 5:
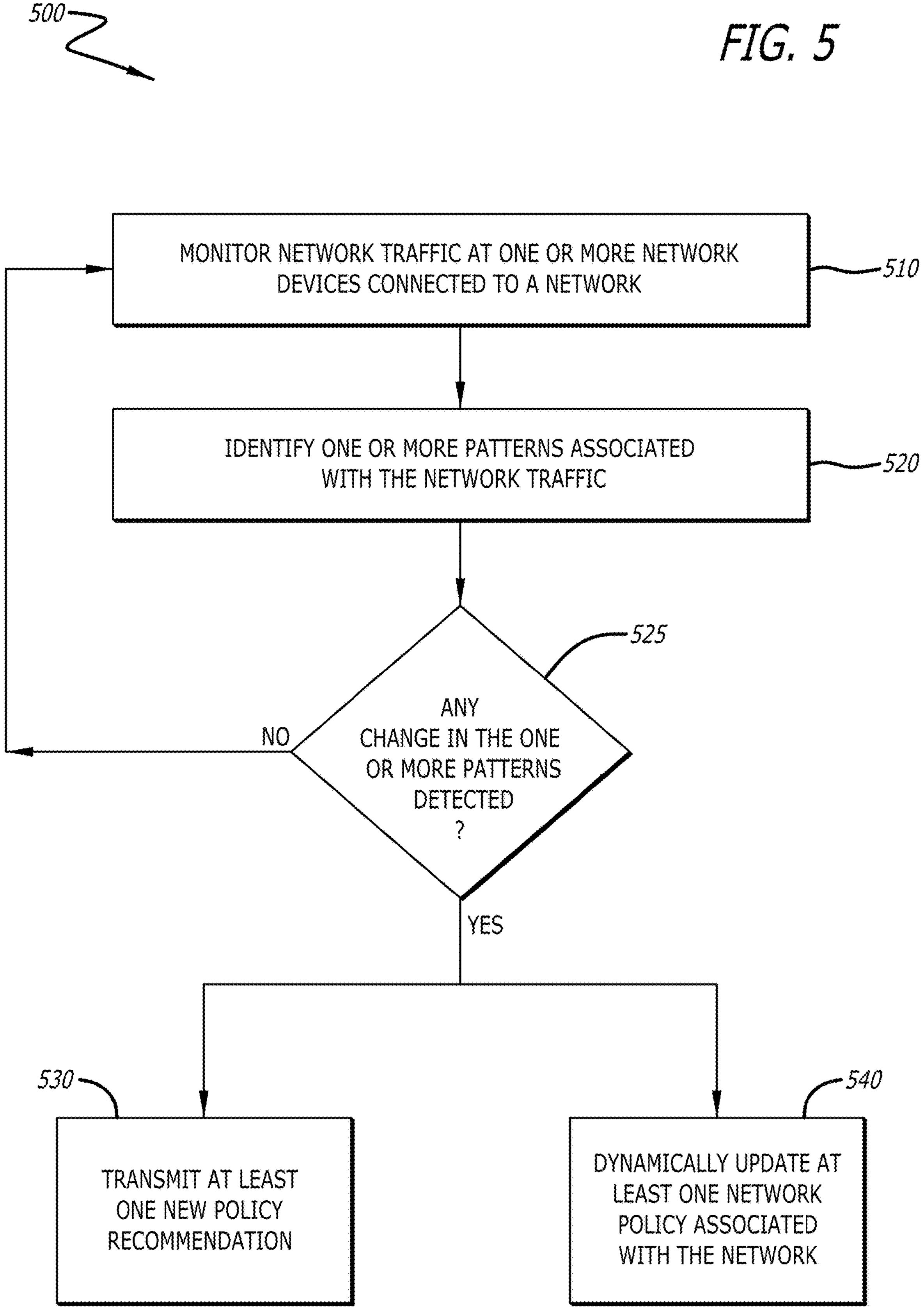
FIG. 5 is a flowchart showing a process for dynamic policy update in accordance with various embodiments of the disclosure.

Referring to FIG. 5, a flowchart showing a process 500 for dynamic policy update in accordance with various embodiments of the disclosure is shown. In many embodiments, the process 500 may monitor network traffic at one or more network devices connected to a network (block 510). In a number of embodiments, the process 500 may monitor a variety of network devices such as such as desktops, laptops, servers, smartphones, routers, projectors, or the like that are connected to a network. The one or more network devices may use various applications such as an email application, web browser, a chat application, video conferencing application, coding environment, or the like. Thus, the process 500 may monitor the traffic generated by these applications running on the one or more network devices. The network may be associated with a set of network policies that govern data transfer rules across the network.

In a variety of embodiments, the process 500 may identify one or more patterns associated with the network traffic (block 520). In many embodiments, the process 500 may analyze traffic patterns or network behavior associated with one or more network devices connected to the network. For example, the process 500 may analyze traffic patterns related to volume of traffic generated by each network device or group of network devices, direction of data flow within the network, such as inbound (incoming) traffic and outbound (outgoing) traffic, peak hours of network usage, distribution of network traffic across different network protocols, such as TCP/IP, UDP, HTTP, FTP, etc., types of applications being used on the network devices, or the like.

In additional embodiments, the process 500 may determine if any change in the one or more patterns is detected (block 525). For example, the process 500 may compare current traffic pattern with one or more baselines deduced from historical traffic data and determine if the current traffic pattern exhibits any deviation from the baselines. In a scenario where the current traffic pattern deviates from the baselines, the process 500 may detect that the traffic pattern has changed. The process 500 may monitor changes in the traffic pattern to detect any violation of one or more network policies by the one or more network devices. In an example scenario, the process 500 may detect a change in traffic pattern between devices of junior level employees and a server. The detected change can be due to a network policy violation by a group of unauthorized network devices attempting to access a confidential file or document stored on the server. In another example, the process 500 may detect a sudden spike in network traffic from an unrecognized source to the one or more network devices. Such change in traffic pattern can indicate multiple network devices being attacked with a malware or malicious software to disrupt, damage, or gain unauthorized access to computer systems or data.

When change in the one or more patterns is detected, in additional embodiments, the process 500 may transmit at least one new policy recommendation (block 530). The process 500 may transmit at least one new policy recommendation to overcome or adjust the detected violations in the one or more network policies. For example, the at least one policy recommendation may include updating the access control for confidential files or documents on the server, so that the unauthorized network devices cannot access such files or documents. In some more examples, the at least one policy recommendation may include blocking incoming messages from the unrecognized source.

In further embodiments, the process 500 may dynamically update at least one network policy associated with the network (block 540). In still additional embodiments, the process 500 may update one or more network policies based on the detected violation of the network policies or one or more pattern changes in the network traffic. For example, the process 500 may update the access control based on the detected unauthorized access of the server. In still additional embodiments, the process 500 may dynamically update the at least one network policy based on the one or more pattern changes in the network traffic without transmitting the policy recommendation to a user device.

Although a specific embodiment for dynamic policy update suitable for carrying out the various steps, processes, methods, and operations described herein is discussed with respect to FIG. 5, any of a variety of systems and/or processes may be utilized in accordance with embodiments of the disclosure. In some additional embodiments, the process 500 may detect one or more security incidents by monitoring the network traffic of the enterprise network. For example, the process 500 may detect data breach incident involving the unauthorized access of sensitive or confidential data stored within the enterprise network. The elements depicted in FIG. 5 may also be interchangeable with other elements of FIGS. 1-4 and 6-7 as required to realize a particularly desired embodiment Referring to FIG. 6, a flowchart showing a process 600 for generating one or more policy update recommendations in accordance with various embodiments of the disclosure is shown is shown. In many embodiments, the process 600 may receive a policy update request for a set of policies associated with a network (block 610). The process 600 may receive the policy update request based on violations detected in one or more policies of the set of network policies. In a number of embodiments, the process 600 may receive specific inputs regarding the detected violation of the one or more network policies and the one or more network devices involved in the detected violation.

In a variety of embodiments, the process 600 may retrieve network flow data and network inventory data associated with the network (block 620). In many embodiments, the process 600 may access a distributed file system to gather information regarding the network flow data and the network inventory data. The network flow data may refer to the actual flow of packets within the network, whereas the network inventory data may include information regarding the devices in the network that generate the network data.

In additional embodiments, the process 600 may pre-process the network flow data and the network inventory data (block 630). The process 600 may pre-process the network flow data and the network inventory data using various big data algorithms such as EDA algorithms, clustering algorithms, classification algorithms, dimensionality reduction algorithms, or the like. In additional embodiments, the process 600 may include multiple devices belonging to different categories (for example, edge devices, servers, virtual machines (VMs), smartphones, laptops, routers, desktop computers, CCTVs, wearable devices, etc.) that generate different types of unstructured traffic in the network depending upon the type of protocol used, type of packet size, header information, type of communication, or the like. Therefore, the process 600 may pre-process the network flow data and the network inventory data to obtain processed data structure.

In further embodiments, the process 600 may input at least one of the network flow data or the network inventory data to a recommendation model (block 640). The process 600 may input the pre-processed structured data of the network flow data or the network inventory data to the recommendation model. In still additional embodiments, the process 600 may input the pre-processed structured data of the network flow data as well as the network inventory data to the recommendation model, so as to facilitate the knowledge of network topology along with the traffic flow in the network.

In still further embodiments, the process 600 may obtain an output of the recommendation model (block 650). In still additional embodiments, the recommendation model of the process 600 may use a combination of heuristic models and ML models to process the structured input data. The output of the models may include a prioritized list of recommended policy changes (for example, a list of top five policy recommendations), highlighting the most critical or impactful updates that need to be implemented first. Similarly, the output of the recommendation model may include suggestions for the set of network policies, such as adding or removing rules, modifying IP address ranges, or adjusting port/protocol restrictions. In a similar manner, the output may suggest policy updates regarding optimizing network performance for specific applications, such as improving quality of service (QOS) for critical services.

In still several embodiments, the output generated by the models is post-processed for fine-graining and quality to generate a final output of the recommendation model. The recommendation model may analyze the potential impact of the proposed policy updates on network performance, user experience, and operational efficiency. For example, the recommendation model may analyze the impact of each of the recommended policy changes from the prioritized list to determine which policy changes need to be implemented. In an example scenario, the recommendation model may determine that the policy presented at the top of the prioritized list may significantly cause latency for video conferencing applications. In another example, the recommendation model may determine that the policy presented at a third position of the prioritized list may not meet the regulatory requirements. Thus, the recommendation model may remove such recommended policy changes to generate the final output. In still other embodiments, the recommendation model may consider optimized network resource allocation, scalability of the network infrastructure, enhancement of user experience, risk assessments, compliance to industry standards and regulatory requirements, or the like for providing the final output of the one or more policy update recommendations.

In some additional embodiments, the process 600 may generate one or more policy update recommendations (block 660). The process 600 may include one or more policy update recommendations or suggestions to overcome the detected violations in the network policy. For example, if the detected violation of the policy was a security incident involving spam emails to all the employees of an organization, the recommendation model may recommend specific updates to anti-spam policies, e.g., new email filtering rules, new sender verification rules, etc. to verify the authenticity of email senders to prevent such incidents.

In certain embodiments, the process 600 may transmit the one or more policy update recommendations (block 670). The process 600 may transmit the one or more policy recommendations to a controller (e.g., a traffic monitoring device) monitoring the traffic. Prior to transmitting the one or more policy update recommendations, in yet additional embodiments the process 600, may check if the one or more policy update recommendations can be used to make one more adjustments in view of the detected violation(s) or security incident(s). Such adjustments could include recalibrating access controls, revising authentication protocols, updating encryption standards, or reconfiguring network settings. It is envisioned that by evaluating the compatibility and effectiveness of the recommended updates in addressing specific security concerns, proposed policy changes are not only relevant but also practical and feasible within an infrastructure.

Figure 6:
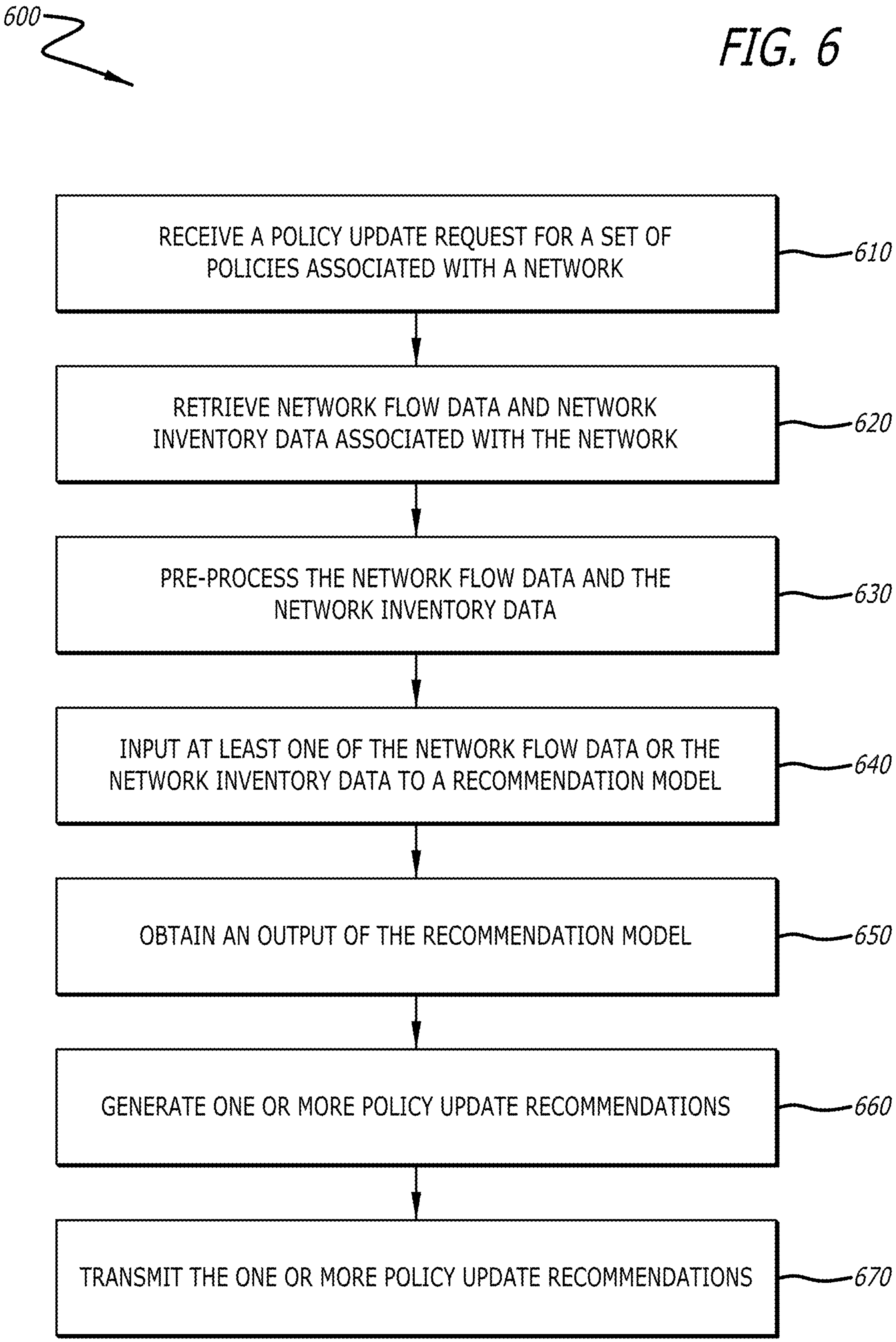
FIG. 6 is flowchart showing a process for generating one or more policy update recommendations in accordance with various embodiments of the disclosure.

Although a specific embodiment for generating one or more policy update recommendations suitable for carrying out the various steps, processes, methods, and operations described herein is discussed with respect to FIG. 6, any of a variety of systems and/or processes may be utilized in accordance with embodiments of the disclosure. In still yet additional embodiments, for example, the process 600 may directly transmit the one or more policy update recommendations to a user device for approval. The elements depicted in FIG. 6 may also be interchangeable with other elements of FIGS. 1-5 and 7 as required to realize a particularly desired embodiment.

Figure 7:
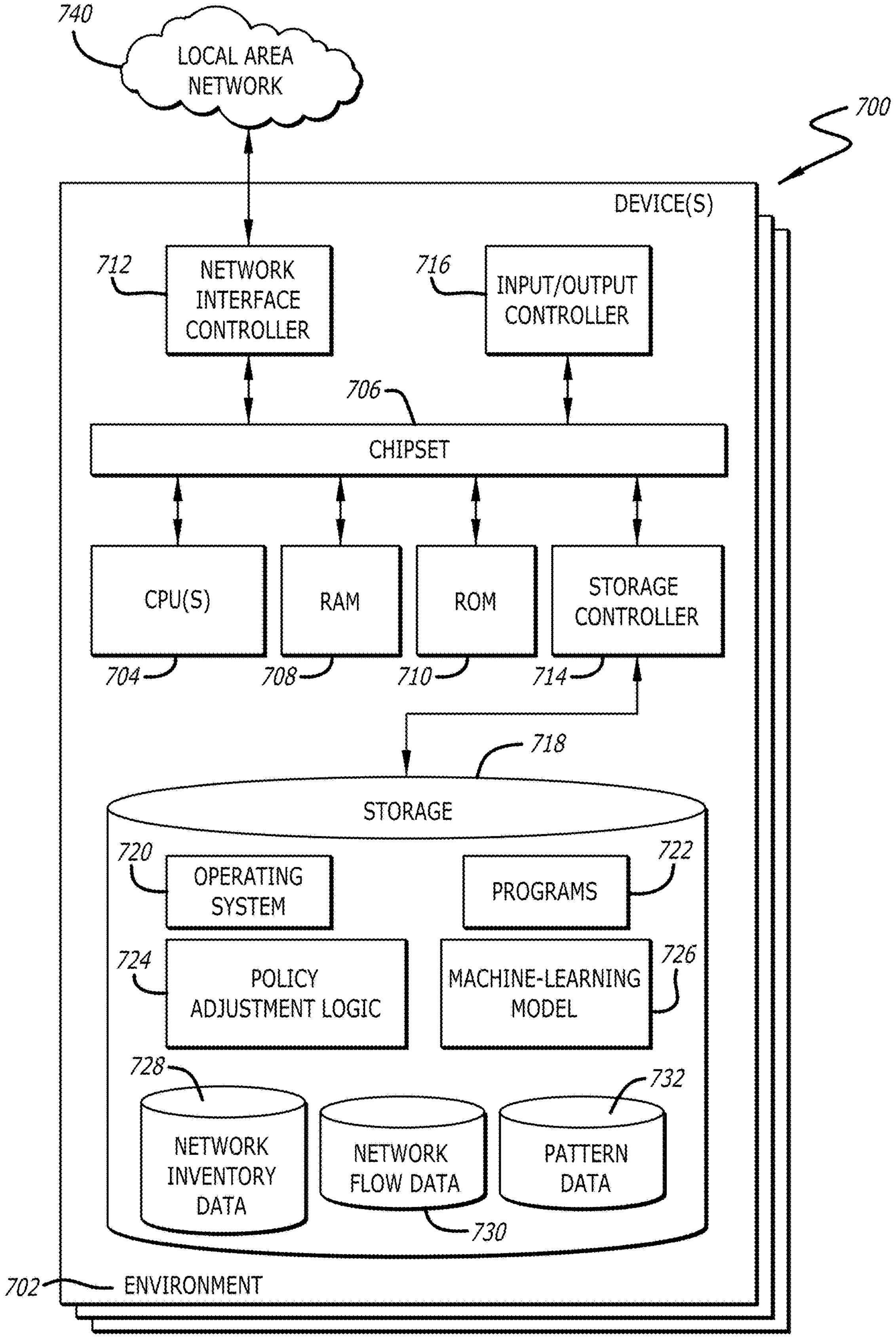
FIG. 7 is a conceptual block diagram for one or more devices capable of executing components and logic for implementing the functionality and embodiments in accordance with various embodiments of the disclosure.

Referring to FIG. 7, a conceptual block diagram for one or more devices 700 capable of executing components and logic for implementing the functionality and embodiments described above is shown. The embodiment of the conceptual block diagram depicted in FIG. 7 can illustrate a conventional server computer, workstation, desktop computer, laptop, tablet, network appliance, e-reader, smartphone, or other computing device, and can be utilized to execute any of the application and/or logic components presented herein. The device 700 may, in some examples, correspond to physical devices or to virtual resources described herein.

In many embodiments, the device 700 may include an environment 702 such as a baseboard or "motherboard," in physical embodiments that can be configured as a printed circuit board with a multitude of components or devices connected by way of a system bus or other electrical communication paths. Conceptually, in virtualized embodiments, the environment 602 may be a virtual environment that encompasses and executes the remaining components and resources of the device 700. In additional embodiments, one or more processors 704, such as, but not limited to, central processing units ("CPUs") can be configured to operate in conjunction with a chipset 706. The processor(s) 704 can be standard programmable CPUs that perform arithmetic and logical operations necessary for the operation of the device 700.

In additional embodiments, the processor(s) 704 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 706 may provide an interface between the processor(s) 704 and the remainder of the components and devices within the environment 702. The chipset 706 can provide an interface to a random-access memory ("RAM") 708, which can be used as the main memory in the device 700 in additional embodiments. The chipset 707 can further be configured to provide an interface to a computer-readable storage medium such as a read-only memory ("ROM") 710 or non-volatile RAM ("NVRAM") 708 for storing basic routines that can help with various tasks such as, but not limited to, starting up the device 700 and/or transferring information between the various components and devices. The ROM 710 or NVRAM 708 can also store other application components necessary for the operation of the device 700 in accordance with various embodiments described herein.

Different embodiments of the device 700 can be configured to operate in a networked environment using logical connections to remote computing devices and computer systems through a network, such as the network 740. The chipset 706 can include functionality for providing network connectivity through a network interface card ("NIC") 712, which may comprise a gigabit Ethernet adapter or similar component. The NIC 712 can be capable of connecting the device 700 to other devices over the network 740. It is contemplated that multiple NICs 712 may be present in the device 700, connecting the device to other types of networks and remote systems.

In further embodiments, the device 700 can be connected to a storage 718 that provides non-volatile storage for data accessible by the device 700. The storage 718 can, for example, store an operating system 720, applications 722, and data 728, 730, 732, which are described in greater detail below. The storage 718 can be connected to the environment 702 through a storage controller 714 connected to the chipset 707. In certain embodiments, the storage 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 700 can store data within the storage 718 by transforming the physical state of the physical storage units to reflect the information being stored. The specific transformation of physical state can depend on various factors. Examples of such factors can include, but are not limited to, the technology used to implement the physical storage units, whether the storage 718 is characterized as primary or secondary storage, and the like.

For example, the device 700 can store information within the storage 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 700 can further read or access information from the storage 718 by detecting the physical states or characteristics of one or more particular locations within the physical storage units.

In addition to the storage 718 described above, the device 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 700. In some examples, the operations performed by a cloud computing network, and or any components included therein, may be supported by one or more devices similar to device 700. Stated otherwise, some or all of the operations performed by the cloud computing network, and or any components included therein, may be performed by one or more devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 718 can store an operating system 720 utilized to control the operation of the device 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 718 can store other system or application programs and data utilized by the device 700.

In various embodiment, the storage 718 or other computer-readable storage media is encoded with computer-executable instructions which, when loaded into the device 700, may transform it from a general-purpose computing system into a special-purpose computer capable of implementing the embodiments described herein. These computer-executable instructions may be stored as application 722 and transform the device 700 by specifying how the processor(s) 704 can transition between states, as described above. In additional embodiments, the device 700 has access to computer-readable storage media storing computer-executable instructions which, when executed by the device 700, perform the various processes described above with regard to FIGS. 1-6. In additional embodiments, the device 700 can also include computer-readable storage media having instructions stored thereupon for performing any of the other computer-implemented operations described herein.

In still further embodiments, the device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can be configured to provide output to a display, such as a computer monitor, a flat panel display, a digital projector, a printer, or other type of output device. Those skilled in the art will recognize that the device 700 might not include all of the components shown in FIG. 7, and can include other components that are not explicitly shown in FIG. 7, or might utilize an architecture completely different than that shown in FIG. 7.

As described above, the device 700 may support a virtualization layer, such as one or more virtual resources executing on the device 700. In some examples, the virtualization layer may be supported by a hypervisor that provides one or more virtual machines running on the device 700 to perform functions described herein. The virtualization layer may generally support a virtual resource that performs at least a portion of the techniques described herein.

In many embodiments, the device 700 can include a policy adjustment logic 724 that can be configured to perform one or more of the various steps, processes, operations, and/or other methods that are described above. Often, the policy adjustment logic 724 can be a set of instructions stored within a non-volatile memory that, when executed by the processor(s)/controller(s) 704 can carry out these steps, etc. In additional embodiments, the policy adjustment logic 724 may be a client application that resides on a network-connected device, such as, but not limited to, a server, switch, a router, personal or mobile computing device, an access point (AP). In certain embodiments, the policy adjustment logic 724 can update one or more network policies based on detected violations of the network policies.

In several embodiments, the policy adjustment logic 724 can enable the device 700 (for example, a controller) to provide one or more policy update recommendations based on detection of violation of the network policies or security incidents. The policy adjustment logic 724 may enable the device 700 to continuously monitor the network traffic pattern to detect any violation of the network policies or any security incidents. The policy adjustment logic 724 can also enable the device 700 to implement or enforce the one or more policy update recommendations on network devices such as desktops, laptops, smartphones, servers, routers, or the like operating in the network.

In a number of embodiments, the storage 718 can include network inventory data 728. In additional embodiments, the network inventory data 728 may include information regarding various devices operating in a network (for example, an enterprise network). In still additional embodiments, the network inventory data 728 may include detailed information about the hardware, software, configurations, and resources present within a network infrastructure. For example, the network inventory data 728 may include list of network devices, such as routers, access points, workstations, laptops, mobile devices, printers, or the like, their specifications, list of installed software on each of the network devices, physical and logical network layouts, and such information necessary to maintain the network infrastructure.

In various embodiments, the storage 718 can include network flow data 730. The network flow data 730 can comprise information regarding all data transfers taking place within the network. In numerous embodiments, the network flow data 730 can include all the data packets, control packets, or management packets that make the traffic flow of the network. The network flow data 730 may provide information regarding source and destination IP addresses, protocol type, packet counts, timestamps, QoS Markings, or the like.

In still additional embodiments, the storage 718 can include pattern data 732. The pattern data 732 may comprise information regarding the traffic pattern of the network. For example, the pattern data 732 may include baseline traffic pattern determined based on analysis if historical network traffic. The baseline traffic pattern can be utilized in detecting changes in traffic pattern. The pattern data 732 may be stored for each of the network devices. In further embodiments, the pattern data 732 may provide insights regarding unusual traffic pattern, unusual network behavior, update to an application request, security incident, access control, or the like.

Finally, in many embodiments, data may be processed into a format usable by a machine-learning model 726 (e.g., feature vectors), and or other pre-processing techniques. The machine-learning ("ML") model 726 may be any type of ML model, such as supervised models, reinforcement models, and/or unsupervised models. The ML model 726 may include one or more of linear regression models, logistic regression models, decision trees, Naïve Bayes models, neural networks, k-means cluster models, random forest models, and/or other types of ML models 726. The ML model 726 may be configured to learn roaming pattern of user devices and generate prediction as to when a user device would roam and what would be a potential trajectory of the moving user device. In additional embodiments, a predictive roaming logic may be implemented by utilizing the ML model 726.

The ML model(s) 726 can be configured to generate inferences to make predictions or draw conclusions from data. An inference can be considered the output of a process of applying a model to new data. This can occur by learning from infrastructure data, sustainability data, and/or health data and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 726 may be generated by human/administrator verifications or may compare predicted outcomes with actual outcomes Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like “advantageous”, “exemplary” or “example” indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean “one and only one” unless explicitly so stated, but rather “one or more.” All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:

a processor;

a network interface controller configured to provide access to a network, wherein the network is associated with a set of policies; and a memory communicatively coupled to the processor, wherein the memory comprises a policy adjustment logic that is configured to:

monitor network traffic at one or more network devices;

detect at least one violation of the set of policies by the monitored network traffic;

transmit one or more policy update recommendations based on the detected at least one violation to a user device, wherein a policy update recommendation of the one or more policy update recommendations is configured to delineate a modification in at least one policy of the set of policies; and receive, from the user device, a rejection input for at least one policy update recommendation of the one or more policy update recommendations;

discard the at least one policy update recommendation based on the rejection input;

transmit a new policy update recommendation based on the rejection input;

identify one or more pattern changes in the network traffic based on the monitoring of the network traffic; and transmit at least one new policy recommendation that corresponds to the one or more pattern changes in the network traffic.

2. The device of claim 1, wherein the one or more policy update recommendations are rendered on a graphical user interface of the user device.

3. The device of claim 1, wherein the policy adjustment logic is further configured to receive, from the user device, an acceptance input for the one or more policy update recommendations.

4. The device of claim 3, wherein the policy adjustment logic is further configured to modify the at least one policy in accordance with the one or more policy update recommendations based on the acceptance input.

5. The device of claim 1, wherein the policy adjustment logic is further configured to dynamically update at least one network policy of the set of policies based on the one or more pattern changes in the network traffic.

6. The device of claim 1, wherein the network traffic is associated with at least one application running on a network device of the one or more network devices.

7. The device of claim 1, wherein the policy adjustment logic is further configured to transmit the one or more policy update recommendations automatically based on the detection of the at least one violation.

8. A device, comprising:

a processor;

a network interface controller configured to provide access to a network, wherein the network is associated with a set of policies; and a memory communicatively coupled to the processor, wherein the memory comprises a policy adjustment logic that is configured to:

receive a policy update request for the set of policies;

input at least one of network flow data or network inventory data to at least one recommendation model;

obtain an output of the at least one recommendation model based on the inputted at least one of the network flow data or the network inventory data;

generate one or more policy update recommendations based on the output;

receive a rejection input for at least one of the generated policy update recommendations;

discard the at least one of the generated policy update recommendations based on the rejection input;

transmit a new policy update recommendation;

identify a pattern change in monitored network traffic;

transmit a policy update recommendation corresponding to the identified pattern change; and generate one or more policy update recommendations based on the output, wherein a policy update recommendation of the one or more policy update recommendations is configured to delineate a modification in at least one policy of the set of policies.

9. The device of claim 8, wherein the policy adjustment logic is further configured to pre-process the at least one of the network flow data or the inventory data prior to inputting to the at least one recommendation model.

10. The device of claim 8, wherein the network flow data includes one or more data packets, one or more management packets, or one or more control packets being transmitted via the network.

11. The device of claim 8, wherein the network inventory data includes a Media Access Control (MAC) address of at least one network device connected to the network.

12. The device of claim 8, wherein the at least one recommendation model includes a machine learning model or a heuristic model.

13. The device of claim 8, wherein the policy adjustment logic is further configured to transmit the one or more policy update recommendations to at least one of a traffic monitoring device or a user device.

14. A method for policy adjustment, comprising:

monitoring network traffic at one or more network devices connected to a network, wherein the network is associated with a set of policies;

detecting at least one violation of the set of policies by the monitored network traffic;

transmitting one or more policy update recommendations based on the detected at least one violation to a user device, wherein a policy update recommendation of the one or more policy update recommendations is configured to delineate a modification in at least one policy of the set of policies;

receiving, from the user device, a rejection input for the policy update recommendation;

discarding the policy update recommendation based on the rejection input;

transmitting a new policy update recommendation;

identifying a pattern change in network traffic based on monitoring the network traffic; and transmitting a policy update recommendation corresponding to the pattern change.

* * * * *